(12) United States Patent
Mariéthoz et al.

(10) Patent No.: US 11,201,551 B2
(45) Date of Patent: Dec. 14, 2021

(54) POWER CONTROL CONVERTER AND METHOD FOR CONTROLLING POWER BETWEEN TWO AC POWER UNITS

(71) Applicant: BERNER FACHHOCHSCHULE, Bern (CH)

(72) Inventors: Jean-Sébastien Mariéthoz, Port (CH); Timothé Delaforge, Biel/Bienne (CH)

(73) Assignee: BERNER FACHHOCHSCHULE, Bern (CH)

( * ) Notice: Subject to any disclaimer, the term of this patent is extended or adjusted under 35 U.S.C. 154(b) by 0 days.

(21) Appl. No.: 16/603,925

(22) PCT Filed: Apr. 10, 2017

(86) PCT No.: PCT/EP2017/058541
§ 371 (c)(1),
(2) Date: Oct. 9, 2019

(87) PCT Pub. No.: WO2018/188720
PCT Pub. Date: Oct. 18, 2018

(65) Prior Publication Data
US 2020/0119653 A1    Apr. 16, 2020

(51) Int. Cl.
*H02M 3/335*    (2006.01)
*H02M 1/00*    (2006.01)
*H02M 1/08*    (2006.01)

(52) U.S. Cl.
CPC ....... *H02M 3/33584* (2013.01); *H02M 1/083* (2013.01); *H02M 1/0058* (2021.05)

(58) Field of Classification Search
CPC ......... H02M 3/335–33584; H02M 2001/0058; H02M 1/0058
See application file for complete search history.

(56) References Cited

U.S. PATENT DOCUMENTS

| | | | |
|---|---|---|---|
| 5,027,264 A | 6/1991 | Dedoncker et al. | |
| 10,211,747 B2* | 2/2019 | Agamy | H02M 1/088 |
| 10,530,243 B2* | 1/2020 | Jimichi | H02M 3/33507 |
| 2009/0171521 A1* | 7/2009 | Moki | B60L 50/60 701/22 |

(Continued)

OTHER PUBLICATIONS

Adam et al., "Review of dc-dc converters for multi-terminal HVDC transmission networks", IET Power Electronics, Feb. 10, 2016, vol. 9, No. 2, pp. 281-296.

(Continued)

*Primary Examiner* — Sisay G Tiku
(74) *Attorney, Agent, or Firm* — Birch, Stewart, Kolasch & Birch, LLP.

(57) ABSTRACT

A power transmission unit for controlling a flow of electric energy between two AC power units is provided. The power transmission unit comprises a main transformer having a first winding and a second winding as well as a switchable auxiliary AC unit for applying a tunable auxiliary AC voltage across an auxiliary AC side of the auxiliary AC unit. The auxiliary AC side is connected in series with the first winding of the main transformer to form a series connection. Further, a power conversion unit comprising the power transmission unit and two AC power units as well as a method for controlling a flow of electric energy by using such a power conversion unit are provided.

10 Claims, 7 Drawing Sheets

(56) References Cited

U.S. PATENT DOCUMENTS

| | | | | |
|---|---|---|---|---|
| 2010/0013317 | A1* | 1/2010 | Ballantine | H02J 1/102 |
| | | | | 307/82 |
| 2011/0235384 | A1* | 9/2011 | Mabuchi | H02M 7/49 |
| | | | | 363/132 |
| 2012/0092915 | A1* | 4/2012 | Okuda | H02M 7/501 |
| | | | | 363/132 |
| 2015/0138841 | A1 | 5/2015 | Pahlevaninezhad et al. | |
| 2017/0279361 | A1* | 9/2017 | Raju | H02M 3/3376 |
| 2017/0331393 | A1* | 11/2017 | Whitehouse | H02M 7/517 |
| 2018/0187653 | A1* | 7/2018 | Kolhatkar | H02J 3/383 |
| 2018/0198393 | A1* | 7/2018 | Wagoner | H02K 7/183 |
| 2020/0021236 | A1* | 1/2020 | Pan | H02J 3/381 |

OTHER PUBLICATIONS

Peng et al., "Power factor correction using a series active filter", PESC'03. 2003 IEEE 34th Annual Power Electronics Specialists Conference, Conference Proceedings, Acapulco, Mexico, Jun. 15-19, 2003; [Annual Power Electronics Specialists Conference], New York, NY; IEEE, US, vol. 4, Jun. 15, 2003, pp. 1500-1504.

Wu et al., "A novel comprehensive control scheme of modular multilevel converter-based power electronic transformer", 2015 5th International Conference on Electric Utility Deregulation and Restructuring and Power Technologies (DRPT), IEEE, Nov. 26, 2015, pp. 2253-2258.

* cited by examiner

Fig. 2D    Fig. 2E

POWER CONTROL CONVERTER AND METHOD FOR CONTROLLING POWER BETWEEN TWO AC POWER UNITS

TECHNICAL FIELD

The invention relates to a power transmission unit for controlling a flow of electric energy between two AC power units. The invention also relates to a power conversion unit for converting electric power. The power conversion unit comprises a power transmission unit according to the invention, a first AC power unit and a second AC power unit. Further, the invention relates to a method for controlling a flow of electric energy by using a power conversion unit according to the invention.

BACKGROUND ART

Electric power converters with galvanic isolation are well known. Such power converters are typically realized by using two AC-DC converters connected via a transformer. The transformer provides the galvanic isolation and the voltage level conversion. For operating such electric power converters, both AC-DC converters are operated at the same frequency. The power flow is controlled by adjusting the phase and the duty cycle of the voltage waveforms. A first disadvantage of this approach is that the phase shift necessary to establish a power flow generates a significant flow of reactive power which causes significant losses in the converters. Another disadvantage is that the power switches of the converters are switched at peak power, i.e. peak voltage and/or peak current which generates significant switching losses.

U.S. Pat. No. 5,027,264 (DeDoncker et al.) for example discloses a power conversion apparatus for DC-DC conversion using dual active bridges with a transformer in between. The active bridges are controlled to generate quasi-square wave voltages which are phase shifted with respect to each other to allow for a current flow from one bridge to the other. The leakage inductance of the transformer and the snubber capacitances of the switches of the bridges form resonant circuits for soft switching, as long as certain conditions for the current are met. Otherwise, natural commutation of the bridge devices will occur resulting in switching losses. Another disadvantage is that the phase shift between the voltages, and therefore also between the voltages and the current, has to be increased in order to increase the transmitted power of the converter. This results however in a lower power factor and increased losses due to the increased reactive current component.

To reduce the switching losses of electric power converters, resonant topologies have been proposed. In such topologies, a capacitor is connected in between the transformer and one of the AC-DC converters. The capacitor is operated in resonance with the leakage inductance of the transformer. Both converters can be switched at zero current, thus avoiding switching losses and significantly improving the efficiency. Also, the flow of reactive power can be eliminated. However, the amplitude and the shape of the current can not be controlled. This results in high conduction losses especially at small power flows as compared to rated power flow. In other words, the useful and efficient operational range of resonant converters is limited.

In order to overcome these deficiencies, US 2015/0138841 (Pahlevaninezhad et al.) proposes a high efficiency DC-DC converter having a current-driven full bridge followed by a transformer and a diode rectifier. To ensure zero-voltage switching for the power semiconductors, a further inductor is needed. Either, this inductor is comprised together with a capacitor in an auxiliary subcircuit or coupled in series to the transformer. Such inductors however can be bulky, heavy and expensive. Further, the disclosed DC-DC converter is not suitable for bidirectional operation.

SUMMARY OF THE INVENTION

It is the object of the invention to provide a power transmission unit pertaining to the technical field initially mentioned, overcoming the disadvantages of the prior art or at least partly overcoming the disadvantages of the prior art. In particular it is an object to provide a power transmission unit allowing for an increased efficiency of the power transmission over the entire operating range thereof. In addition, it is an object of the invention to provide a power conversion unit pertaining to the technical field initially mentioned, overcoming the disadvantages of the prior art or at least partly overcoming the disadvantages of the prior art. Further, it is an object of the invention to provide a method for controlling a flow of electric energy by using a power conversion unit according to the invention, overcoming the disadvantages of the prior art or at least partly overcoming the disadvantages of the prior art.

The solution of the invention is specified by the features of claim 1. According to the invention, a power transmission unit for controlling a flow of electric energy between two AC power units comprises a main transformer having a first winding and a second winding, and a switchable auxiliary AC unit for applying a tunable auxiliary AC voltage across an auxiliary AC side of the auxiliary AC unit, wherein the auxiliary AC side is connected in series with the first winding of the main transformer to form a series connection.

With the use of the power transmission unit according to the invention, any desired power flow can be established between two AC power units when connected to the power transmission unit. Preferably, the first winding and the second winding of the main transformer are separated by a galvanic isolation. Thus, the power transmission unit preferably provides galvanic isolation between the two power units due to its main transformer. When operating the power transmission unit, the power flow does not require any phase shift between the AC voltages of the AC power units. Rather, the AC voltages and AC currents of the AC power units can be in phase. This leads to an improved power factor and minimum reactive power during the power transmission between the two AC power units. Therefore, the main transformer, the auxiliary AC unit and both AC power units can be operated at high efficiency. If the AC power units are converters, the power transmission unit according to the invention further allows for zero-current switching of the AC power units over the entire operating range. In other words, the power transmission unit allows for combining the advantages of conventional power transmission (wide operating range) and the advantages of resonant power conversion (minimum switching losses and excellent efficiency). As a consequence thereof, the power transmission unit is suitable for medium to high switching frequencies as for example several 10 KHz, or even more than 100 KHz. This, in turn, allows for a higher power density of the power transmission unit as compared to prior art power transmission units. I.e. it allows for power transmission units with less weight and requiring less volume. In particular, the main transformer can be of reduced size and weight as compared to main transformers designed for a same power transmission at lower frequencies.

In the present text, AC power units are electrical units serving as a supply of electric power and/or as a load of electric power. An AC power unit has an AC side. The AC side may have one, two, three or even more phases. Examples of AC power units may include but are not restricted to: AC-AC converters, AC-DC converters, DC-AC converters, bidirectional AC-AC converters, bidirectional AC-DC converters, electric motors (AC loads), electric generators (AC supplies), transformers, AC grids and any combination thereof. Preferably, the AC side of an AC power unit supplies a square wave AC voltage or is capable of receiving a square wave AC voltage. The AC voltage is preferably between 200 V and 4 KV, and particularly preferably between 500 V and 1 KV. The power of the AC power units is preferably between 200 W and 3 MW, and particularly preferably between 20 KW and 400 KW. An AC current of an AC power unit is preferably between 2 A and 1000 A, and particularly preferably between 10 A and 100 A. However, any other voltage, power and AC current are possible as well. Above mentioned ratings with respect to the voltage, the current and/or the power of an AC power unit apply in particular for a module of an AC power unit. If such modules are connected in parallel or series to increase a power rating of an AC power unit comprising more than one module, the total rating for the voltage, the current and/or the power of such an AC power unit may be a multiple of the rating of a module.

The main transformer may have a single phase or three phases. Such main transformers are very common and advantageous. However, other numbers of phases are also possible, as for example two phases or even more than three phases.

Preferably, the main transformer is a medium frequency transformer. Medium frequency means a frequency much larger than the common line frequencies of 50 Hz or 60 Hz. A medium frequency is preferably between 1 KHz and 1 MHz, and particular preferably between 10 KHz and 100 KHz. Alternatively, the main transformer may be a different transformer than a medium frequency transformer like for example a low frequency transformer or a high frequency transformer.

Advantageously, the main transformer is chosen to have a leakage inductivity which is as small as possible. The smaller the leakage inductance, the faster the current through the transformer can rise and fall. This allows for higher switching frequencies, which in turn allows for smaller transformers and thus, for higher power densities. However, the main transformer may have any leakage inductance if higher switching frequencies are not of interest Also advantageously, the main transformer is chosen to have a main inductivity being as large as possible. The larger the main inductivity of the main transformer is, the smaller is a phase shift between a first current through the first winding and a second current through the second winding of the main transformer.

The auxiliary AC unit can be any switchable electrical unit for applying a tunable auxiliary AC voltage across an auxiliary AC side of the auxiliary AC side. Thus, the auxiliary AC unit is capable of providing and receiving an AC voltage. Examples of auxiliary AC units may include but are not restricted to: AC-AC converter, DC-AC converter, bidirectional AC-AC converter and bidirectional AC-DC converter.

Preferably, the power transmission unit comprises a second auxiliary AC unit. The second auxiliary AC unit is advantageously connected in series with the second winding of the main transformer to form a second series connection.

The second auxiliary AC unit may have one or more of features described for the switchable auxiliary AC unit as described below in more detail. In particular, the second auxiliary AC unit may be a switchable second auxiliary AC unit for applying a tunable second auxiliary AC voltage across a second auxiliary AC side of the second auxiliary AC unit. However, the power transition unit may go without such a second auxiliary AC unit.

The auxiliary AC unit is part of the power transmission unit and thus separate from the two AC power units between which the flow of electric energy can be controlled by the power transmission unit. Preferably, the AC power units have a higher voltage rating than the auxiliary AC unit, i.e. the AC power unit is suitable for handling higher voltages than the auxiliary AC unit. Thus, the auxiliary AC unit is preferably constructed differently to the two AC power units. However, the auxiliary AC unit may be of a same construction as one or both of the two AC power units.

Preferably, the first winding of the main transformer has less turns than or equal turns as the second winding of the main transformer. Thus, the first winding of the main transformer preferably is the low voltage winding of the main transformer. In other words, the auxiliary AC unit is preferably connected in series with the low voltage winding of the main transformer. However, as an alternative, the second winding of the main transformer may have less turns than or equal turns as the first winding of the main transformer and thus be the low voltage winding of the main transformer.

In operation, the power transmission unit can be connected with the two AC power units. For example, a first AC side of a first AC power unit of the two AC power units can be connected with the series connection formed by the auxiliary AC side and the first winding of the main transformer, while a second AC side of a second AC power unit of the two power units can be connected to the second winding of the main transformer.

In a preferred embodiment, the auxiliary AC unit of the power transmission unit further comprises an energy storage.

Using an energy storage is a simple way to provide an AC voltage across the auxiliary AC side of the auxiliary AC unit.

Energy storages are available in a vast variety like for example capacitors or batteries. As an alternative for or in addition to the energy storage, the auxiliary AC unit can be connected to a power grid. This might be advantageous if the auxiliary AC unit is intended to transmit electric power beyond what is needed to only control a flow of power between the two AC power units.

In case the power transmission unit comprises a second auxiliary AC unit, the second auxiliary AC unit of the power transmission unit preferably comprises a second energy storage.

Preferably, the auxiliary AC unit of the power transmission unit further comprises an auxiliary DC side. This has the advantage that an energy storage for providing a DC voltage can be connected with the auxiliary DC side.

Many different energy storages for providing a DC voltage are available on the market, as for example capacitors, ultra-capacitors and batteries. As an alternative thereto, any energy storage providing not a DC voltage but, for example, an AC voltage, could be used.

Preferably, the auxiliary AC unit is devoid of a power supply delivering electric power to be transmitted over the power transmission unit according to the invention. The auxiliary AC unit further may be devoid of a connection to a power supply or power grid delivering electric power to be transmitted over the power transmission unit. However, the auxiliary AC unit may comprise or be connectable to a small power supply for pre-charging the energy storage or to compensate for parasitic losses of the auxiliary AC unit. Such a variant can be advantageous because it may simplify the operation of the power transmission unit.

In case the power transmission unit comprises a second auxiliary AC unit, the second auxiliary AC unit of the power transmission unit preferably comprises a second auxiliary DC side. Advantageously, the second auxiliary AC unit comprises a second energy storage for providing a DC voltage, the second energy storage being connected with the second auxiliary DC side. The second auxiliary AC unit may however go without the second energy storage.

Preferably, the energy storage is a capacitor.

The capacitor can be designed so that there is essentially zero voltage change across the capacitor during operation of the power transmission unit. Usually, such a capacitor is much larger than a capacitor designed for resonant operation. During operation of the power transmission unit, the capacitor can maintain a predefined AC voltage. As an alternative, the capacitor could be designed for resonant operation. In resonant operation, the capacitor can be exposed to an AC voltage.

In case the power transmission unit comprises a second auxiliary AC unit with a second energy storage, the second energy storage is preferably a capacitor.

In a preferred embodiment, the auxiliary AC unit further comprises a converter.

Converters allow for flexibly providing voltages, in particular AC voltages. Such converters are easy to control. In particular when connected with an energy storage, the converter can provide therefrom any desired AC voltage across the auxiliary AC side of the auxiliary AC unit.

Advantageously, the converter is switchable. Alternatively, a non switchable converter like the Leonard converter, also known as the Leonard drive or control system, can be used.

For example, a switchable converter can be a full bridge converter having a DC side and an AC side. Advantageously, the full bridge converter has one phase or three phases. However, the full bridge converter may instead have two phases or even more than three phases. A full bridge converter may comprise an H-bridge converter. The full bridge converter may comprise, for example, four switches and four diodes, such that each of the four switches has an antiparallel diode. The switches can be semiconductor devices, as for example transistors. Preferred transistors are IGBT, BJT and FET, in particular MOSFET. One, more than one, or all switches can be devoid of having a capacitor connected in parallel. Advantageously, a possible DC side of the full bridge converter can be connected to an energy storage, as for example a capacitor and/or to the small power supply as mentioned above. Other than these connections, the DC side of the full bridge converter can be devoid of any further connections, in particular to any load or power supply intended for transmitting power over the power transmission unit.

Although the switches of the converter of the auxiliary unit might be switched "hard", i.e. at full current and at full voltage, the switching losses thereby caused are comparably small since the voltage of the auxiliary AC unit and thus the auxiliary AC voltage is advantageously chosen to be significantly smaller than the voltages of the AC power units.

Advantageously, the auxiliary AC unit can comprise an active half bridge in parallel with a capacitive half bridge. Such topologies have the advantage that they require less semiconductor switches and can thus be constructed simpler. However, their operating range is limited.

In case the power transmission unit comprises a second auxiliary AC unit, the second auxiliary AC unit of the power transmission unit preferably further comprises a second converter. This second converter preferably provides one or more of the above mentioned features of the possible converter of the auxiliary unit.

In a further preferred embodiment, the auxiliary AC unit further comprises an auxiliary transformer.

An auxiliary transformer has the advantage that it enables improving the performance of the power transmission unit for some applications.

The auxiliary transformer preferably has a first auxiliary winding and a second auxiliary winding. The first auxiliary winding of the auxiliary transformer advantageously forms the AC side of the auxiliary AC unit.

Preferably, the auxiliary transformer is a medium frequency transformer such as explained above with respect to the main transformer. However, the auxiliary transformer can be any other transformer, too.

Advantageously, the auxiliary transformer is separate from the main transformer of the power transmission unit. Furthermore, the auxiliary transformer is advantageously constructed differently from the main transformer. Preferably, the first auxiliary winding of the auxiliary transformer has a much smaller voltage rating than the first winding of the main transformer. I.e. the first winding of the main transformer is preferably suitable for handling higher voltages than the first auxiliary winding of the auxiliary transformer. However, it is also possible to use an auxiliary transformer having a similar voltage rating as the main transformer. Thus, it is as well possible that the auxiliary transformer and the main transformer are constructed the same.

In case the power transmission unit comprises a second auxiliary AC unit, the second auxiliary AC unit of the power transmission unit comprises in a preferred variant a second auxiliary transformer with a second first auxiliary winding thereof forming the second AC side of the second auxiliary AC unit. Preferably, the second first auxiliary winding of the second auxiliary transformer has a smaller voltage rating than the second winding of the main transformer. I.e. the second winding of the main transformer is preferably suitable for handling higher voltages than the second first auxiliary winding of the second auxiliary transformer. In another preferred variant where the power transmission unit comprises a second auxiliary AC unit, the second auxiliary AC unit goes without such a second auxiliary transformer.

Advantageously, the auxiliary AC unit is adapted to have an energy balance of essentially zero.

In this case, the auxiliary AC unit does preferably not provide a continuous power flow but only an auxiliary AC voltage that is needed to control of the power flow between the AC power units. Therefore, the auxiliary AC unit can be operated at minimum losses. Hence, the efficiency of the transmission unit is further increased.

Advantageously, the auxiliary AC unit serves as a provider of electric power during a first portion of a half-wave of the auxiliary AC voltage and serves as a receiver of electric power during a second portion of a half-wave of the auxiliary AC voltage. Thus, the first portion of the half-wave of the auxiliary AC voltage is preferably different from the second portion of a half-wave of the auxiliary AC voltage. The electric energy provided by the auxiliary AC unit during the first portion of a half-wave of the auxiliary AC voltage is essentially equal to the electric energy received during the second portion of a half-wave of the auxiliary AC voltage. This has the advantage that the auxiliary AC unit has an energy balance of essentially zero.

The term "essentially zero" means that the energy balance of the auxiliary AC unit is exactly zero when using an ideal, lossless auxiliary AC unit. However, a real auxiliary AC unit may have parasitic losses as for example ohmic losses. Therefore, the energy balance of a real auxiliary AC unit is not exactly zero but essentially zero. The parasitic power is preferably at least one order, particular preferably at least two orders, at least three or even at least four orders of magnitude smaller than the power transmitted by the power transmission unit. Therefore, compared to the transmitted power, the parasitic power is essentially zero. This has the advantage that only the parasitic power has to be replenished to the auxiliary AC unit, or for example to the energy storage of the auxiliary AC unit.

A peak auxiliary AC voltage of the auxiliary AC unit is preferably much smaller than a peak first AC voltage of the first AC power unit. The peak auxiliary AC voltage of the auxiliary AC unit is preferably between 1% and 20%, particular preferably between 3% and 15%, and most preferably between 5% and 10% of the peak first AC voltage of the first AC power unit. However, the peak auxiliary AC voltage of the auxiliary AC unit may be 10% or more of the first AC voltage of the first AC power unit.

The frequency of the auxiliary AC voltage of the auxiliary AC unit can be equal with the frequency of the first AC voltage of the first AC power unit (and with the second AC voltage of the second AC power unit). Advantageously, a current flowing through the auxiliary AC unit during a first portion of a half-wave of the auxiliary AC voltage is symmetric with the current flowing through the auxiliary AC unit during a second portion of the half-wave of the auxiliary AC voltage, with the symmetry axis being in the middle of said half-wave.

In case the power transmission unit comprises a second auxiliary AC unit, the second auxiliary AC unit of the power transmission unit is preferably adapted to have an energy balance of essentially zero. However, the second auxiliary AC unit may be adapted to have a different energy balance, too.

In a further preferred embodiment, the auxiliary AC unit further comprises a control unit for switching the auxiliary AC unit for applying the tunable auxiliary AC voltage across the auxiliary AC side of the auxiliary AC unit.

By use of a control unit, any power flow between the AC power units can flexibly and/or automatically be achieved.

In particular, the control unit may be adapted to switch the auxiliary AC unit to ensure that the energy balance of the auxiliary AC unit is essentially zero. The control unit can comprise for example a micro controller.

In case the power transmission unit comprises a second auxiliary AC unit, the control unit may be adapted to switch the second auxiliary AC unit of the power transmission unit for switching the second auxiliary AC unit for applying the tunable second auxiliary AC voltage across the second auxiliary AC side of the second auxiliary AC unit, too, or the second auxiliary AC unit may comprise a second control unit for switching the second auxiliary AC unit for applying the tunable second auxiliary AC voltage across the second auxiliary AC side of the second auxiliary AC unit.

According to another aspect of the invention, a power conversion unit for converting electric power comprises a power transmission unit according to the invention. This power conversion unit further comprises a first AC power unit connected with the series connection of the power transmission unit and a second AC power unit connected with the second winding of the main transformer.

The power conversion unit has the advantage that it allows for a very efficient conversion of electric energy. In particular it turned out that the power conversion unit according to the invention has a higher efficiency than the prior art power converters. The present power conversion unit enables to obtain a real waveform of the currents through the AC power units which is close to the theoretically optimal waveform to achieve minimum losses. Furthermore, the harmonic content of the currents is low. Also, the electromagnetic interference (EMI) is very low. Additionally, the power conversion unit according to the invention is more robust and easier to control than resonant converters. Any desired power flow can be established between the first AC power unit and the second AC power unit, while providing galvanic isolation between them. In particular, the present power conversion unit enables to establish any DC-DC conversion, or AC-AC conversion, or DC-AC conversion, or AC-DC conversion in a very efficient way. In addition, the advantages mentioned in the context of the power transmission unit apply for the power conversion unit as well.

Preferably, the first AC power unit and/or the second AC power unit are constructed in a modular way. Thus, the AC power units advantageously consist of modular converters being connected in series and/or in parallel to increase the power rating of the power conversion unit. In this case a power rating of an AC power unit comprising more than one modular converter, the total rating for the voltage, the current and/or the power of such an AC power unit may be a multiple of the rating of a module mentioned earlier. However, any other than a modular construction can be used as well.

In case the power conversion unit comprises a second auxiliary AC unit having a second auxiliary AC side, the second auxiliary AC side is preferably connected in series with the second winding of the main transformer to form a second series connection. This second series connection is preferably connected with the second AC power unit. However, the second auxiliary AC unit may be connected differently, too.

In a preferred embodiment, the first AC power unit comprises a converter having a first AC side being connected with the series connection.

For example, the converter of the first AC power unit may be a DC-AC converter, and preferably a bidirectional DC-AC converter. A power conversion unit having such a bidirectional DC-AC converter can convert with excellent efficiency a DC voltage into any other voltage and vice versa because a bidirectional DC-AC converter allows for a flow of energy through the power transmission unit and through the first AC power unit in both directions.

The bidirectional DC-AC converter can, for example, be a full bridge converter. As an alternative thereto, however, a unidirectional DC-AC converter could be employed.

In a preferred embodiment, the second AC power unit comprises a converter having a second AC side being connected with the second winding of the main transformer.

In an example, the converter of the second AC power unit is a DC-AC converter, and preferably a bidirectional DC-AC converter. With respect to the converter of the second AC power unit, the same applies as mentioned above with respect to the converter for the first AC power unit.

In case the power transmission unit comprises a second auxiliary AC unit having a second auxiliary AC side, the second auxiliary AC side is preferably connected in series with the second winding of the main transformer to form a second series connection, and the second AC power unit is advantageously an DC-AC converter, preferably a bidirectional DC-AC converter, wherein the AC side thereof is preferably connected with the second series connection.

Advantageously, the power conversion unit further comprises a control unit for controlling the auxiliary AC unit and/or the first AC power unit and/or the second AC power unit.

The control unit is advantageously adapted to control or switch the power transmission unit or the auxiliary AC unit for controlling the flow of electric energy between the first and the second AC power units such that a desired flow of energy is passing through the power conversion unit. The desired flow of electric energy may include the direction of the flow of energy, i.e. from the first AC power unit to the second AC power unit or vice versa, and/or the magnitude of the flow of power. Thereby, the control unit can allow for an automated flow of energy. In addition, the control unit may be adapted to control or switch the power transmission unit or the auxiliary AC unit to ensure that the energy balance of the auxiliary AC unit is essentially zero.

If the control unit is not adapted to control the first AC power unit and/or the second AC power unit, the efficiency of the power conversion might also depend on the actual AC voltages of the first AC unit and the second AC power unit. Therefore, best results are achieved if the control unit is adapted to control the auxiliary AC unit, the first AC power unit and the second AC power unit, wherein the control unit is preferably adapted to switch the auxiliary AC unit.

The control unit can comprise for example a micro controller and control software.

The control unit may be part of the power transmission unit as mentioned above.

In case the power transmission unit comprises a second auxiliary AC unit, the control unit may be adapted to control or switch the second auxiliary AC unit of the power transmission unit, also.

In a preferred embodiment, the control unit is adapted for zero-current switching of the first AC power unit and/or the second AC power unit.

Zero-current switching of the first AC power unit and/or the second AC power unit allows for a reduction of switching losses of the power switches of the first AC power unit and/or the second AC power unit. A reduction of switching losses leads to a further improvement of the efficiency of the power conversion unit.

The term "zero-current" switching preferably includes switching of currents at times when the current is smaller than 20% of its peak value, particular preferably at times when the current is smaller than 10% of its peak value and most preferably at times when the current is smaller than 5% of its peak value.

Preferably, the control unit is adapted for controlling the auxiliary AC unit such that a current through the first power unit is in phase with the first AC voltage of the first AC power unit, and/or such that a current through the second AC power unit is in phase with the second AC voltage of the second AC power unit.

Thereby, the control unit enforces a good power factor which results in a further improvement of the efficiency of the power conversion unit.

If the auxiliary AC unit comprises power switches, the control unit is advantageously adapted to control the power switches such that a current through the first AC power unit is in phase with a voltage of the first AC power unit, and/or such that a current through the second AC power unit is in phase with the second AC voltage of the second AC power unit.

In case the power transmission unit comprises a second auxiliary AC unit, the control unit is preferably adapted to additionally control the second auxiliary AC unit such that a current through the first AC power unit is in phase with the first AC voltage of the first AC power unit, and/or such that a current through the second AC power unit is in phase with the second AC voltage of the second AC power unit.

In a preferred embodiment, the control unit is adapted for switching the auxiliary AC unit such that a predetermined amplitude of a current passing through the first AC power unit is achieved, and/or such that a predetermined amplitude of a current passing through the second AC power unit is achieved.

Thereby, the control unit allows for an automation of the magnitude of current flow through the power conversion unit.

According to a further aspect of the invention, a method for controlling a flow of electric energy by using a power conversion unit according to the invention comprises a step A and a step B. Step A comprises providing an auxiliary AC voltage across the auxiliary AC side of the auxiliary AC unit of the power conversion unit for shaping a first current through a first AC power unit of the power conversion unit and/or for shaping a second current through a second AC power unit of the power conversion unit. Thereby, the auxiliary AC voltage comprises pulses of different polarities during a half wave of the auxiliary AC voltage. Step B comprises synchronizing a first AC voltage across a first AC side of the first AC power unit with a second AC voltage across a second AC side of the second AC power unit, and/or synchronizing the first AC voltage across the first AC side of the first AC power unit with the auxiliary AC voltage.

By use of the method according to the invention, any desired power flow can be established within the power conversion unit according to the invention. The power flow can be established at a zero phase shift between the AC voltages of the AC power units. The AC voltages can be in phase, or at least nearly in phase, with the currents through the AC power units. This leads to a good power factor and minimum reactive power within the power conversion unit. Therefore, the power conversion unit can be operated at high efficiency.

The pulses of the auxiliary AC voltage can have for example a rectangular shape. During one half wave of the auxiliary AC voltage, there is at least one pulse having a positive voltage and at least one pulse having a negative voltage. If, for example, the first half wave of the auxiliary AC voltage starts with a pulse having a positive voltage followed by a pulse having a negative voltage, the second half wave of the auxiliary AC voltage preferably starts with a pulse having a negative voltage followed by a pulse having a positive voltage.

Also other shapes than a rectangular shape of the pulses of the auxiliary AC voltage are possible, like for example saw tooth shape, triangular shape or sinusoidal shape. Such shapes might have advantages in special applications and special situations. However, the rectangular shape of the pulses of the auxiliary AC voltage have the advantage that they can be provided at little effort.

The term "synchronizing an AC voltage X with an AC voltage Y" in the present text means to ensure that AC voltage X has the same frequency as AC voltage Y and that AC voltage X has the same phase as AC voltage Y.

In case the auxiliary AC unit comprises an auxiliary converter and an energy storage, the method according to the invention can further comprise an initial step of charging the energy storage as to achieve a predetermined voltage of the energy storage.

In case the power transmission unit of the power conversion unit comprises a second auxiliary AC unit, step A preferably further comprises providing a second auxiliary AC voltage across a second auxiliary AC side of a second auxiliary AC unit for shaping a first current through a first AC power unit and/or for shaping a second current through a second AC power unit. Thereby, the second auxiliary AC voltage preferably comprises pulses of different polarities during a half wave of the second auxiliary AC voltage. Step B preferably further comprises synchronizing a first AC voltage across a first AC side of the first AC power unit with the second auxiliary AC voltage.

Advantageously, generating the pulses of the auxiliary AC voltage comprises a step A1 of switching a converter of the auxiliary AC unit such that the auxiliary AC voltage has a first polarity and a step A2 of switching the converter of the auxiliary AC unit such that the auxiliary AC voltage has a second polarity opposite to the first polarity. Furthermore, synchronizing the first AC voltage across the first AC side of the first AC power unit with the second AC voltage across the second AC side of the second AC power unit preferably comprises a step B1 of switching a converter of the first AC power unit such that the first AC voltage has a third polarity and a step B2 of switching the converter of the first AC power unit such that the first AC voltage has a fourth polarity opposite to the third polarity.

If the first AC power unit, the second AC power unit and/or the auxiliary AC unit comprise converters, the method according to the invention can easily be implemented by switching the converter(s) in order to achieve the desired currents through the AC power units and thereby the desired flow of electric energy between the two AC power units. Step A1 can initiate an incline or a decline of the first current, respectively, depending on the polarity of the auxiliary AC voltage. Step A2 can initiate a decline or an incline, respectively, of the first current, depending on the polarity of the auxiliary AC voltage.

If the first polarity is a positive polarity, then the second polarity is a negative polarity. If the first polarity is a negative polarity, then the second polarity is a positive polarity. The same applies for the third and the fourth polarity: If the third polarity is a positive polarity, then the fourth polarity is a negative polarity. If the third polarity is a negative polarity, then the fourth polarity is a positive polarity. Thereby, the third polarity and the fourth polarity are independent of the first polarity and the second polarity. Thus, the third polarity can be the same or opposite to the first polarity, while the fourth polarity can be the same or opposite to the second polarity, respectively, For example, the first AC voltage of the first AC power unit can have the shape of a square wave. Also other shapes of the first AC voltage are possible, as for example a sinusoidal shape. Even though a sinusoidal shape has advantages in special applications and special situations, a first AC voltage having the shape of a square wave has the advantage that it can be provided at little effort.

Advantageously, step A1 is executed before step B1. Alternatively, step A1 may be executed simultaneously to or after step B1. Preferably, step A2 is executed before step B2. Alternatively, step A2 is executed simultaneously to or after step B2.

In case the power transmission unit comprises a second auxiliary AC unit with a converter, generating the pulses of the second auxiliary AC voltage preferably comprises a step A11 of switching the converter of the second auxiliary AC unit such that the second d auxiliary AC voltage has a first polarity and a step A21 of switching the converter of the second auxiliary AC unit such that the second auxiliary AC voltage has a second polarity opposite to the first polarity.

Advantageously, generating the pulses of the auxiliary AC voltage further comprises a step A3 of switching the converter of the auxiliary AC unit to provide a conducting path with zero voltage across the auxiliary AC side of the auxiliary AC unit. Furthermore, synchronizing the first AC voltage across the first AC side of the first AC power unit with the second AC voltage across the second AC side of the second AC power unit further preferably comprises a step B3 of switching off all switches of the converter of the first AC power unit.

The execution of step A3 allows for maintaining the first current and/or maintaining the second current. Thereby, even more different shapes for the first current and/or the second current are enabled. In particular, the waveforms of the first current and/or the second current can be shaped such as to achieve an optimum shape to minimize conduction losses. With the execution of step B3, a period of time can be created during which the first current and/or the second current remain zero. Thereby, the switching losses can further be reduced. This period of time can be very short. Preferably, the period is smaller than 3 µs, particular preferable smaller than 1 µs and most preferably smaller than 0.3 µs.

If step B3 is executed while the first current is not zero, said current may flow through the antiparallel diodes of the converter of the first AC power unit when all switches of the converter are turned off. If step B3 is executed while the first current is zero, the turned off switches, in particular in the case of power semiconductor switches, may remain conducting until all charges are removed from said semiconductor switches.

During the first half wave of the auxiliary AC voltage, step A3 is preferably executed after step A1 and before step A2, i.e. between step A1 and A2. During the second half wave of the auxiliary AC voltage, step A3 is advantageously executed after step A2 and before step A1, i.e. between step A2 and A1.

During the first half wave of the auxiliary AC voltage, step B3 is preferably executed after step B1 and before step B2, i.e. between step B1 and B2. During the second half wave of the auxiliary AC voltage, step B3 is preferably executed after step B2 and before step B1. The steps A1, A2, A3, B1, B2 and B3 may however be executed in a different order, too.

In case the power transmission unit comprises a second auxiliary AC unit, step A3 preferably further comprises switching the converter of the second auxiliary AC unit to provide a conducting path with zero voltage across a second auxiliary AC side of the second auxiliary AC unit.

Preferably, synchronizing the first AC voltage across the first AC side of the first AC power unit with the second AC voltage across the second AC side of the second AC power unit further comprises a step B4 of switching a converter of the second AC power unit to provide across the second AC side a second AC voltage having a fifth polarity and a step B5 of switching the converter of the second AC power unit to provide across the second AC side a second AC voltage having a sixth polarity which is opposite to the fifth polarity.

If both the converter of the first AC power unit and the converter of the second AC power unit are actively switched, a bidirectional flow of energy between the two AC power units can be established. In this case, step B4 can initiate an incline or a decline of a second current through the second AC power unit depending on the polarity of the auxiliary AC voltage while step B5 can initiate a decline or an incline of the second current, depending on the polarity of the auxiliary AC voltage.

For example, the second AC voltage of the second AC power unit can have a shape of a square wave. Also other shapes of the second AC voltage are possible, as for example a sinusoidal shape. Even a sinusoidal shape can have advantages in special applications and special situations. However, the second AC voltage having the shape of a square wave can be provided at little effort.

In an advantageous variant, step A1 is executed before step B4. Furthermore, step A2 is advantageously executed before step B5. However, the order of steps A1 and B4, as well as of steps A2 and B5 can be different.

In a preferred embodiment, synchronizing the first AC voltage across the first AC side of the first AC power unit with the second AC voltage across the second AC side of the second AC power unit further comprises a step B6 of switching off all switches of the converter of the second AC power unit.

With the execution of step B6, a second period of time can be created during which the first current and/or the second current remain zero. Thereby, the switching losses can further be reduced. The second period of time can be very short. Preferably, the second period is smaller than 3 μs, particular preferable smaller than 1 μs and most preferably smaller than 0.3 μs.

If step B6 is executed while the second current is not zero, said current may flow through the antiparallel diodes of the converter of the second AC power unit when all switches of the converter are turned off. If step B6 is executed while the second current is zero, the turned off switches, in particular in the case of power semiconductor switches, may remain conducting until all charges are removed from said semiconductor switches.

During the first half wave of the auxiliary AC voltage, step B6 is executed after step B4 and before step B5, i.e. between step B4 and B5. During the second half wave of the auxiliary AC voltage, step B6 can be executed after step B5 and before step B4, i.e. between step B5 and B4.

Advantageously, steps B1 and/or B2 and/or B3 are performed when the first current is zero.

Zero current switching reduces the switching losses. Thus, performing steps B1 and/or B2 and/or B3 when the first current is zero has the advantage that the efficiency of the power conversion unit, in particular the efficiency of the first AC power unit can be increased.

Preferably, also steps B4 and/or B5 and/or B6 are performed when the first current is zero.

Preferably, steps B1 and B4 are performed at the same time, and steps B2 and B5 are performed at the same time. Also, steps B3 and B6 can be are performed at the same time.

By performing steps B1 and B4 at the same time, and by performing steps B2 and B4 at the same time, and by performing steps B3 and B6 at the same time, the converter of the first AC power unit and the converter of the second AC power unit are operated synchronously to avoid losses caused by reactive power.

In a preferred variant, the second AC power unit is diode rectifier. This has the advantage that no active switching of the second AC power unit is required for synchronization as synchronization happens automatically.

Advantageously, a mean value of the auxiliary AC voltage measured over a half wave of the auxiliary AC voltage is zero.

This prevents the first and/or second current to be devoid of any DC component. Hence, the main transformer is prevented from saturation.

Preferably, a mean value of a power flow through the auxiliary AC unit measured over a half wave of the power flow through the auxiliary AC unit is essentially zero.

This has the advantage that the auxiliary AC unit does not provide a continuous power flow but only provides an auxiliary AC voltage that is needed to control of the power flow between the AC power units. Therefore, the auxiliary AC unit can be operated at minimum losses. Hence, the efficiency of the transmission unit is further increased. Further explanations in this respect have already been given in the context of the discussion of the power transmission unit.

The method according to the invention as well as the power transmission unit and the power conversion unit according to the invention are particular advantageous if used in data centers (in particular for providing DC power), in battery chargers, in railways and electric vehicles (again in particular for providing DC power), in electricity grids as solid state transformers or for connecting AC grids with DC grids at all voltage levels, and in power conversion applications of renewable energies as for example wind energy devices and solar energy (photovoltaic) devices.

Other advantageous embodiments and combinations of features come out from the detailed description below and the totality of the claims.

BRIEF DESCRIPTION OF THE DRAWINGS

The drawings used to explain the embodiments show:
FIG. 2D a fourth embodiment of the auxiliary AC unit;
FIG. 2E a fifth embodiment of the auxiliary AC unit.

In the figures, the same components are given the same reference symbols.

PREFERRED EMBODIMENTS

Figure 1:
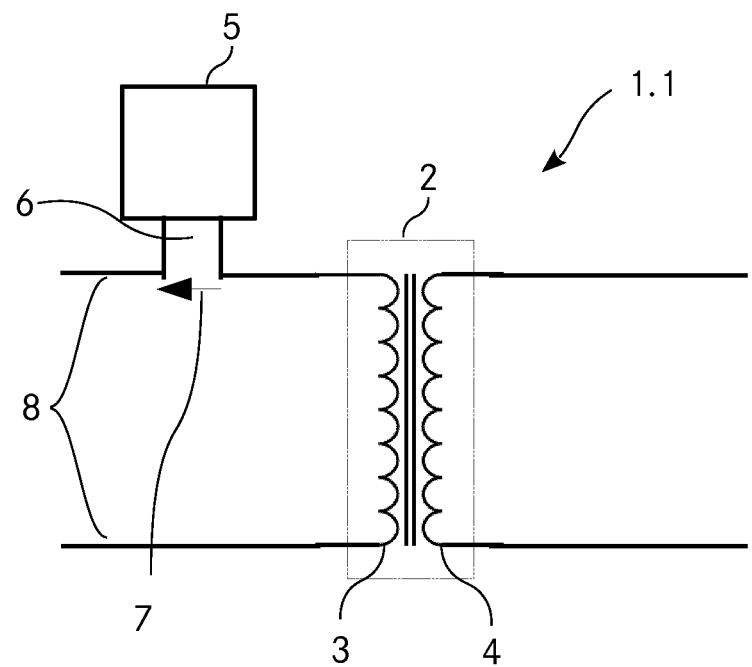
FIG. 1 a first embodiment of a power transmission unit according to the invention with an auxiliary AC unit.

FIG. 1 shows a first embodiment of a power transmission unit 1.1 according to the invention. The power transmission unit 1.1 comprises a main transformer 2 having a first winding 3 and a second winding 4. The power transmission unit 1.1 further comprises a switchable auxiliary AC unit 5 with an auxiliary AC side 6. The auxiliary AC unit 5 provides a tunable auxiliary AC voltage 7 across the auxiliary AC side 6. The auxiliary AC side 6 of the auxiliary AC unit 5 is connected in series with the first winding 3 of the main transformer 2 to form a series connection 8. The series connection 8 of the power transmission unit 1 can be connected to an AC power unit (not shown). For proper operation of the power transmission unit 1.1, the series connection 8 should not be shorted.

Figures 2A, 2B, 2C:
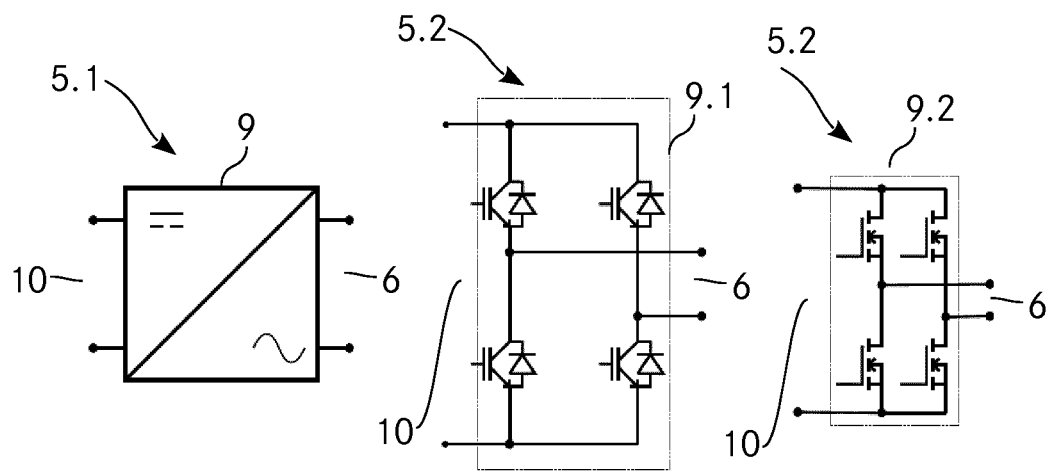
FIG. 2A a first embodiment of the auxiliary AC unit.
FIG. 2B a second embodiment of the auxiliary AC unit.
FIG. 2C a third embodiment of the auxiliary AC unit.

FIG. 2A shows a first possible embodiment of the switchable auxiliary AC unit 5.1. In the present case, the auxiliary AC unit 5.1 comprises a converter 9 which is a DC AC converter. The auxiliary AC unit 5.1 has in addition to the auxiliary AC side 6 also an auxiliary DC side 10.

FIG. 2B shows a second possible embodiment of the switchable auxiliary AC unit 5.2 comprising a full bridge converter 9.1. The auxiliary AC unit 5.2 has again an auxiliary AC side 6 and an auxiliary DC side 10. The full bridge converter 9.1 has four insulated gate bipolar transistors (IGBT) as switching devices with antiparallel diodes.

FIG. 2C shows a third possible embodiment of the switchable auxiliary AC unit 5.3 with an auxiliary AC side 6, an auxiliary DC side 10 and a full bridge converter 9.2 having four field effect transistors (FET), in particular four metal oxide semiconductor FET (MOSFET) with integrated antiparallel diodes as switching devices.

FIG. 2D shows a fourth possible embodiment of the switchable auxiliary AC unit 5.4 comprising a converter 9.3 with a capacitive half bridge having two capacitors and an active half bridge having two IGBTs with each having an antiparallel diode.

FIG. 2E shows a fifth possible embodiment of the switchable auxiliary AC unit 5.5. The auxiliary AC unit 5.5 comprises a converter 9.4 with a capacitive half bridge and an active half bridge having six cascaded IGBTs. Each IGBT has an antiparallel diode.

The auxiliary AC units 5.1-5.5 shown in FIG. 2A-E may comprise an energy storage like for example a capacitor or a battery. This energy storage may for example be connected with the auxiliary DC side of the respective auxiliary AC unit 5.1-5.5. The auxiliary AC units 5.1-5.5 may however not comprise such an energy storage. For example, they can be connected with their auxiliary DC side to some energy supply.

Figure 3:
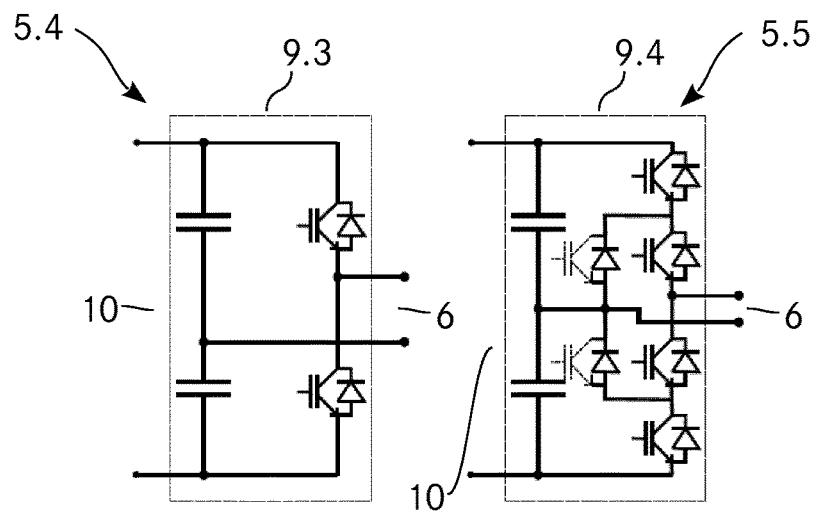
FIG. 3 a second embodiment of the power transmission unit according to the invention.
Figure 3:
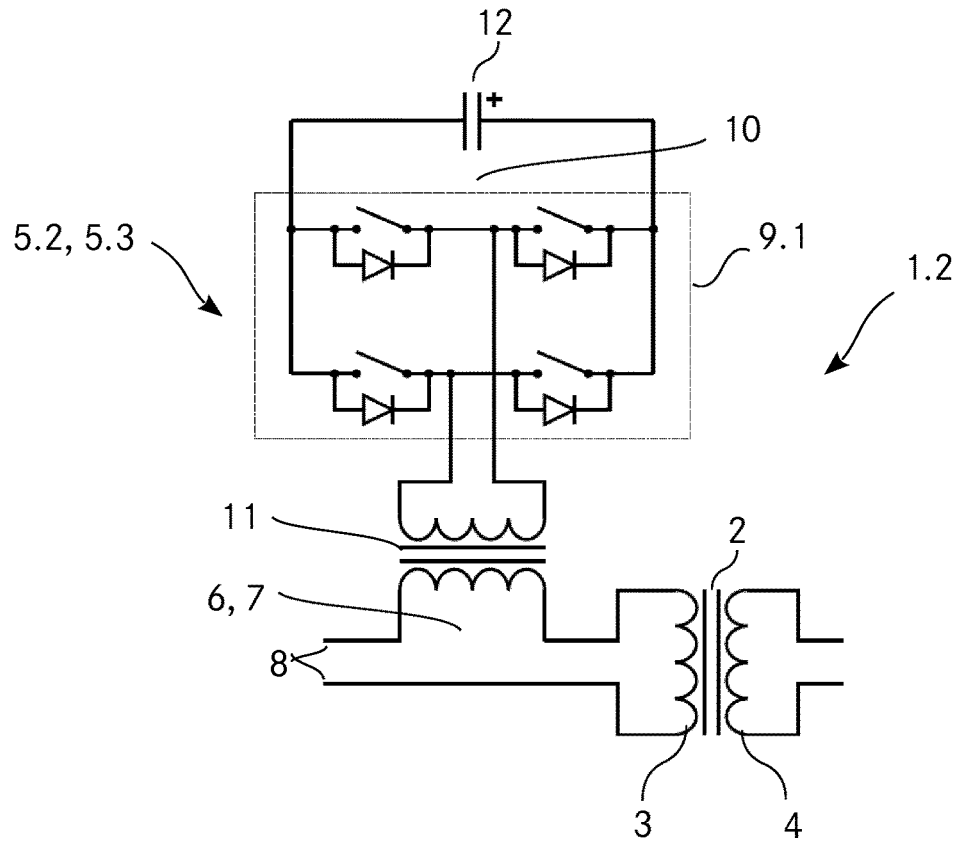

Each of the embodiments of the auxiliary AC unit 5.1-5.5 shown in FIG. 2A-E can be used within the power transmission unit 1.1 as shown in FIG. 1 or within the power transmission unit 1.2 as shown in FIG. 3 to form further embodiments of the power transmission unit without being explicitly shown here.

FIG. 3 shows a second possible embodiment of the power transmission unit 1.2 according to the invention. In this embodiment, the auxiliary AC unit 5.2, 5.3 comprises a full bridge converter 9.1, 9.2 having four switches with each having an antiparallel diode as the ones shown in FIGS. 2B and 2C. The switches of such full bridges converters can be IGBTs, FETs or MOSFETs. The auxiliary DC side 10 of the auxiliary AC unit 5.2, 5.3 is connected to an energy storage 12. The energy storage 12 provides a DC voltage across the auxiliary DC side 10. The DC voltage is indicated by the polarity sign next to the energy storage 12. In the present case, the energy storage 12 is a capacitor. The AC side of the full bridge converter 9.1, 9.2 is connected to an auxiliary transformer 11, which is further connected in series with the first winding 3 of the main transformer 2 to form the series connection 8.

The auxiliary AC side 6 providing the auxiliary AC voltage 7 is formed by a winding of the auxiliary transformer 11.

Although shown together in this second embodiment of the power transmission unit 1.2, the auxiliary AC unit 5.2, 5.3 is not required to comprise the auxiliary transformer 11 and the energy storage 12. Thus, the auxiliary transformer 11 connecting the AC side of the full bridge converter 9.1, 9.2 in series with the first winding 3 of the main transformer 2 can be omitted. Similarly, the energy storage 12 and/or the full bridge converter 9.1 can be omitted.

Figure 4:
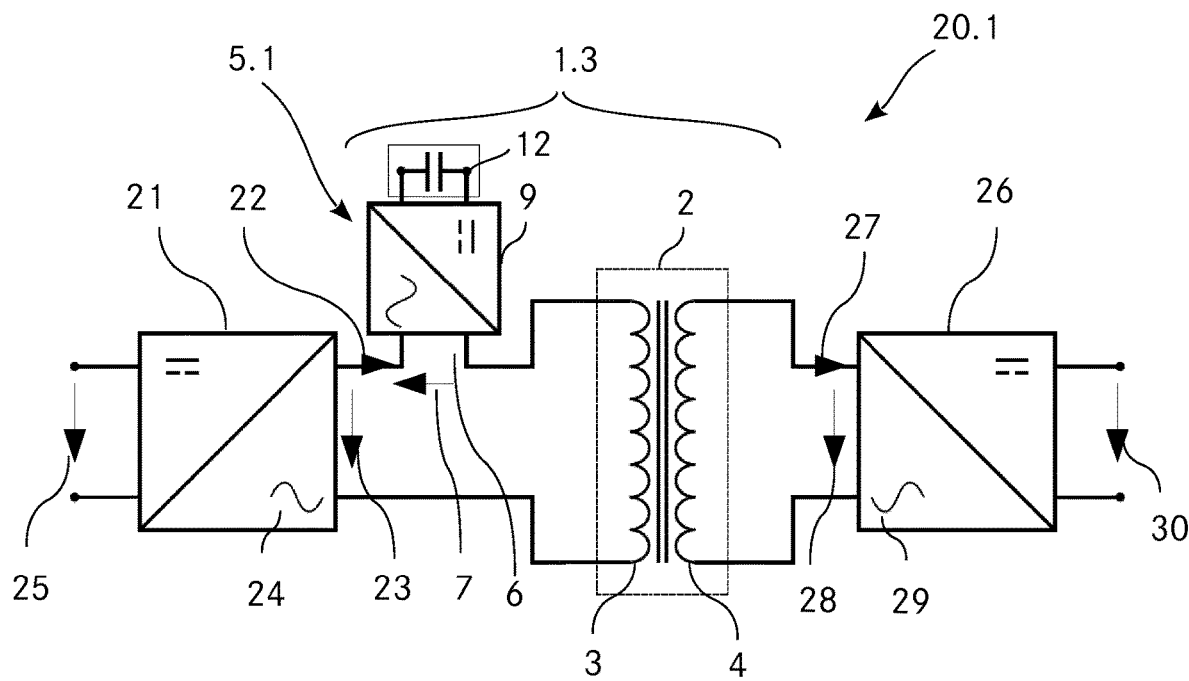
FIG. 4 a first embodiment of a power conversion unit comprising a power transmission unit according to the invention and two AC power units.

FIG. 4 shows a first possible embodiment of a power conversion unit 20.1 comprising a power transmission unit 1.3 according to the invention. The power conversion unit 20.1 comprises a first AC power unit 21 providing a first current 22 and a first AC voltage 23 across a first AC side 24 of the first AC power unit 21. The first AC power unit 21 is a DC AC converter fed by a first main voltage 25 which is in this embodiment of the power conversion unit 20.1 a DC voltage. The first AC side 24 of the first AC power unit 21 is connected to a power transmission unit 1.3 according to the invention. Instead of the power transmission unit 1.3, any other power transmission unit according to the invention could be employed. For example, one of the power transmission units 1.1 or 1.2 shown in FIGS. 1 and 3, respectively, could be employed. The power transmission unit 1.3 shown here in FIG. 4 comprises the auxiliary AC unit 5.1 as shown in FIG. 2A with the converter 9 and the energy storage 12 being a capacitor. The power transmission unit 1.3 further comprises the main transformer 2 with a first winding 3 and a second winding 4. The second winding 4 of the main transformer 2 is connected to a second AC power unit 26. The second AC power unit 26 provides a second current 27 and a second AC voltage 28 across a second AC side 29 of the second AC power unit 26. The second AC power unit 26 is a DC AC converter fed by the second main voltage 30 which is in this embodiment of the power conversion unit 20.1 a DC voltage. The direction of the arrows indicating the first current 22, the first AC voltage 23, the first main voltage 25, the second current 27, the second AC voltage 28 and the second main voltage 30 in FIG. 4 is for counting purpose only and shall not indicate an actual current direction or voltage polarity. In fact, several of these currents or voltages are alternating, i.e. have two directions or polarities, respectively, during a period of the alternating voltage or current. In this embodiment of the power conversion unit 20.1, a flow of energy from the first AC power unit 21 via the power transmission unit 1.3 to the second AC power unit 26 is possible, as well as vice versa. The flow of energy is controlled by the tunable auxiliary AC voltage 7 across the auxiliary AC side 6. The voltage across the first winding 3 of the main transformer 2 corresponds to the sum of the first AC voltage 23 and the auxiliary AC voltage 7. The voltage across the second winding 4 of the main transformer 2 corresponds to the second AC voltage 28. Assuming, the main transformer 2 has a winding ratio of one, i.e. the first winding 3 and the second winding 4 have a same number of turns, and further assuming that the first main voltage 25 and the second main voltage 30 are equal and, therefore, the first AC voltage 23 and the second AC voltage 30 are equal as well, then the polarity and the magnitude of the auxiliary AC voltage 7 determine the direction and the magnitude of the flow of current and energy through the power transmission unit 1.3. It is remarked, that a mean power flow of the auxiliary AC unit can be zero. It is further remarked that the series connection formed by the auxiliary AC side 6 and the first winding 3 of the main transformer 2 is devoid of being short circuited for proper operation of the power transmission unit 1.3. Rather, as mentioned before, the series connection formed by the auxiliary AC side 6 and the first winding 3 of the main transformer 2 is connected to the first power unit 21. Detailed curves of the currents and voltages of the power transmission unit 20.1 will be discussed in FIG. 6.

Figures 5A, 5B, 5C:
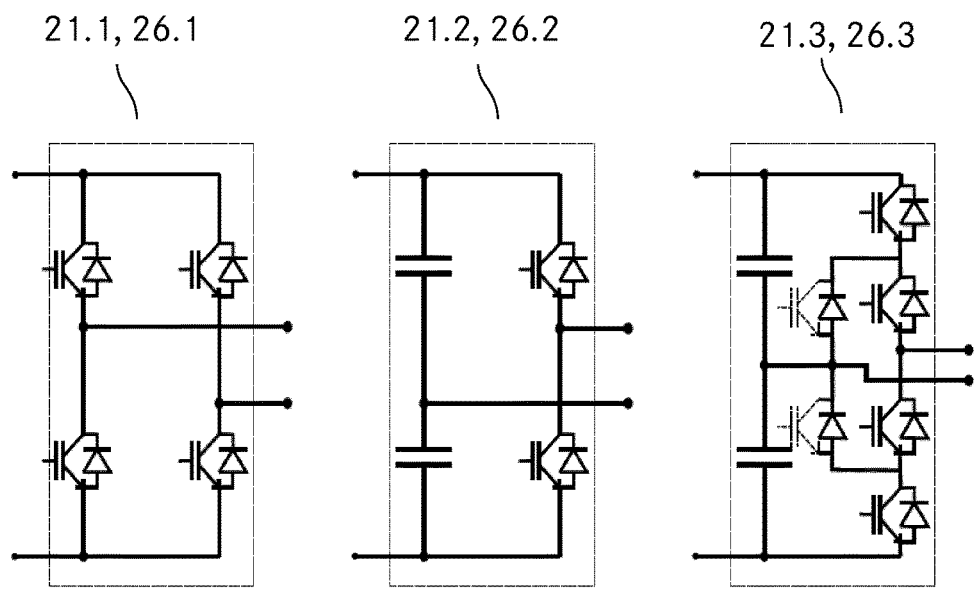
FIG. 5A a first embodiment of a AC power unit for use in the power conversion unit.
FIG. 5B a second embodiment of the AC power unit for use in the power conversion unit.
FIG. 5C a third embodiment of the AC power unit for use in the power conversion unit.

FIG. 5A shows a first possible embodiment of the first AC power unit 21.1 and the second AC power unit 26.1, each comprising a full bridge converter having four insulated gate bipolar transistors (IGBT) as switching devices with anti-parallel diodes.

FIG. 5B shows a second possible embodiment of the first AC power unit 21.2 and the second AC power unit 26.2, each comprising a converter with a capacitive half bridge and an active half bridge. The capacitive half bridge comprises two capacitors and the active half bridge has two IGBTs with each having an antiparallel diode.

FIG. 5C shows a third possible embodiment of the first AC power unit 21 and the second AC power unit 26 comprising a converter with a capacitive half bridge and an active half bridge with cascaded IGBTs, i.e. six IGBTs. Each IGBT has an antiparallel diode.

Any of the embodiments of first AC power unit 21.1-21.3 and any of the embodiments of the second AC power unit 26.1-26.3, or any combination thereof, can be used within the power conversion unit 21.1 as shown in FIG. 4.

In general, as shown here for a single phase system, the topologies of the auxiliary AC unit 5 and the topologies of the first AC power unit 21 and the second AC power unit 26 can be the same. However, the power ratings can be very different, i.e. the power rating of the first and the second AC power unit 21, 26 can be much higher than the power rating of the auxiliary AC unit 5. For example, they can differ by a factor of more than 20.

Figure 6:
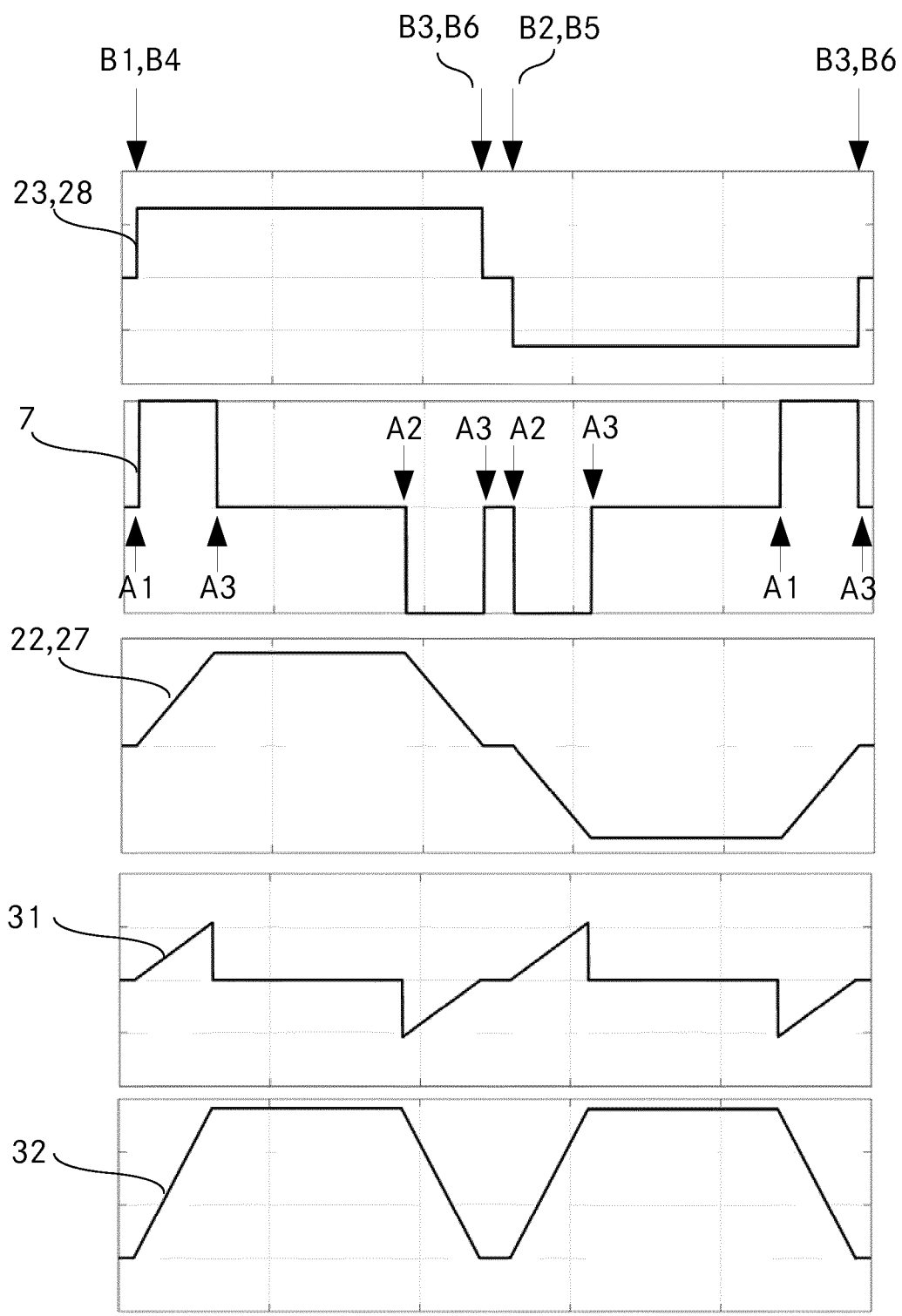
FIG. 6 waveforms of the voltages, currents and power of the power conversion unit.

FIG. 6 shows waveforms of the voltages, currents and power when operating the power conversion unit 20.1 shown in FIG. 4. To simplify the explanation, it is assumed that the first winding 3 of the main transformer 2 and the second winding 4 of the main transformer 2 have the same number of turns, i.e. the ratio of the main transformer is one. Therefore, the first AC voltage 23 and the second AC voltage 28 have the same shape (most upper and thus first curve in FIG. 6). Also, the first current 22 and the second current 27 have the same shape (third curve in FIG. 6).

At the beginning of the first half wave of the waveforms, all converters are assumed to be switched off. As long as a converter of the first AC power unit 21 is switched off and as long as a converter of the second AC power unit 26 is switched of, the first AC voltage 23 and the second AC voltage 28 are zero (first curve in FIG. 6). Upon switching on both converters simultaneously (steps B1 and B4), i.e. at the same time such that there is no phase shift between the first AC voltage 23 and the second AC voltage 28, said voltages jump to their respective main voltages. Before or latest upon switching on the converters of the AC power units 21, 26, the converter 9 of the auxiliary AC unit 5.1 is switched on as well (step A1) to provide the auxiliary AC voltage 7 (second curve in FIG. 6). Thus, a first pulse of the auxiliary AC voltage 7 having a first polarity is initiated. The first winding 3 of the main transformer 2 is exposed to the sum of the first AC voltage 23 and the auxiliary AC voltage 7 while the second winding 4 of the main transformer 2 is exposed to the second AC voltage 28, only. The voltage difference (corresponding to the auxiliary voltage 7) causes the first current 22 and the second current 27 (third curve in FIG. 6) to rise. Due to the voltages 7, 23, 28 having rectangular waveforms, the first current 22 and the second current 27 rise linearly. Also, the auxiliary power 31 (fourth curve of FIG. 6) delivered by the auxiliary AC unit 5 as well as the transmitted power 32 (bottom curve of FIG. 6) from the first AC power unit 21 via the power transmission unit 1.3 to the second AC power unit 26 rise linearly.

Next, the converter 9 of the auxiliary AC unit 5.1 is switched such as to reduce the auxiliary AC voltage 7 to zero (step A3). Therefore, the first pulse of the auxiliary AC voltage 7 having a first polarity is terminated. In this state, the auxiliary AC unit 5.1 continues to conduct the first current 22 which stops rising further and remains constant. The auxiliary power 31 of the auxiliary unit 5.1 falls to zero as the auxiliary AC voltage 7 is zero. In contrast thereto, the transmitted power 32 stops to rise further and remains constant.

To initiate a second pulse of the auxiliary AC voltage 7 having a second polarity opposite to the first polarity during the first half wave of the waveforms, the converter 9 of the auxiliary AC unit 5.1 is switched to provide the auxiliary AC voltage 7 having the second polarity (step A2). Thus, the first current 22 and the second current 27 start to fall linearly. Due to the reversed auxiliary AC voltage 7, the auxiliary power 31 is now negative and delivered back to the auxiliary AC unit 5.1. As can be seen easily, the sum of the of the positive auxiliary power 31 during the first pulse of the auxiliary AC voltage 7 and the negative auxiliary power 31 during the second pulse of the auxiliary AC voltage 7 is equal to zero. Therefore, the mean value of the auxiliary power 31 measured over a half wave, in particular over the first half wave, is zero. At step A2, the transmitted power 32 starts to fall linearly but still provides a positive contribution to the power transmission during the entire first half wave.

When the first current 22 and the second current 27 become zero, the converter 9 of the auxiliary AC unit 5.1 is switched off (step A3) which terminates the second pulse of the first have wave of the auxiliary AC voltage 7. The converters of the first AC power unit 21 and the second AC power unit 26 are switched off as well (step B3 and step B6, respectively). All voltages and currents remain zero for a short period of time to minimize switching losses. If step A3 were omitted, there would be no period of time during which the currents are zero such that the second half wave starts without delay.

Now, the second half wave begins. In principal, the second half wave is symmetrical with the first have wave, but with reversed voltages and currents.

Upon switching on the converters of the first AC power unit 21 and the second AC power unit 26 simultaneously (steps B2 and B5, respectively), i.e. at the same time such that there is no phase shift between the first AC voltage 23 and the second AC voltage 28, said voltages jump to their respective main voltages 25, 30 but with a polarity opposite to the polarity during the first half wave (first curve of FIG. 6). Before or latest upon switching on the converters of the AC power units 21, 26, the converter 9 of the auxiliary AC unit 5.1 is switched on as well (step A2) to provide the auxiliary AC voltage 7 (second curve in FIG. 6). A third pulse corresponding to the second pulse of the auxiliary AC voltage 7 having a second polarity opposite to the first polarity is thus initiated. As a result, the first winding 3 of the main transformer 2 is exposed to the sum of the first AC voltage 23 and the auxiliary AC voltage 7 while the second winding 4 of the main transformer 2 is exposed to the second AC voltage 28, only. The voltage difference (corresponding to the auxiliary voltage 7) causes the first current 22 and the second current 27 (third curve in FIG. 6) to fall below zero. Due to the voltages 7, 23, 28 having rectangular waveforms, the first current 22 and the second current 27 fall linearly. The auxiliary power 31 (fourth curve of FIG. 6) delivered by the auxiliary AC unit 5.1 and the transmitted power 32 (bottom curve of FIG. 6) from the first AC power unit 21 via the power transmission unit 1.3 to the second AC power unit 26 rise linearly.

Next, the converter 9 of the auxiliary AC unit 5.1 is switched such as to reduce the auxiliary AC voltage 7 to zero (step A3). Therefore, the third pulse of the auxiliary AC voltage 7 having a second polarity is terminated. In this state, the auxiliary AC unit 5.1 continues to conduct the first current 22 which stops falling further but remains constant. The auxiliary power 31 of the auxiliary AC unit 5.1 falls to zero as the auxiliary AC voltage 7 is zero. In contrast thereto, the transmitted power 32 stops to rise further and remains constant.

To initiate a fourth pulse corresponding to the first pulse of the auxiliary voltage 7 having again the first polarity opposite to the second polarity, the converter 9 of the auxiliary AC unit 5.1 is switched as to provide the auxiliary AC voltage 7 having the first polarity (step A1). Thus, the first current 22 starts to rise linearly. Due to the negative first current 22, the auxiliary power 31 is negative and delivered back to the auxiliary AC unit 5.1. As can be seen easily, the sum of the of the positive auxiliary power 31 during the third pulse of the auxiliary AC voltage 7 and the negative auxiliary power 31 during the fourth pulse of the auxiliary voltage 7 is equal to zero. Therefore, the mean value of the auxiliary power 31 measured over a half wave, in particular over the second half wave, is zero. At step A1, the transmitted power 32 starts to fall linearly but still provides a positive contribution to the power transmission during the entire second half wave.

When the first current 22 and the second current 27 become zero, the converter 9 of the auxiliary AC unit 5.1 is switched off (step A3) which terminates the fourth pulse of the auxiliary AC voltage 7. The converters of the first AC power unit 21 and the second AC power unit 26 are switched off as well (steps B3 and B6, respectively). All voltages and current remain zero for a short period of time to minimize switching losses. If step A3 were omitted, there would be no period of time during which the currents are zero such that the first half wave starts again without delay.

Figure 7:
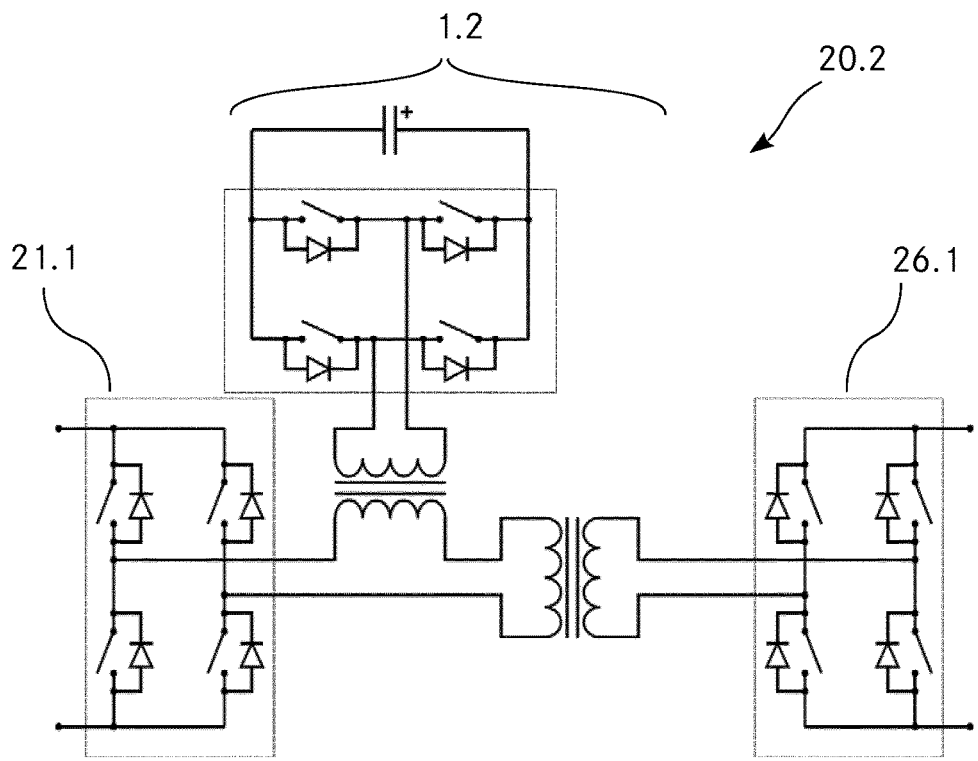
FIG. 7 a second embodiment of the power conversion unit comprising a power transmission unit according to the invention and two AC power units.

FIG. 7 shows a second possible embodiment of the power conversion unit 20.2 comprising as first AC power unit 21.1 and as second AC power unit 26.1 a power unit 21.1, 26.1 as shown in FIG. 5A and as power transmission unit 1.2 the power transmission unit 1.2 shown in FIG. 3.

Figure 8:
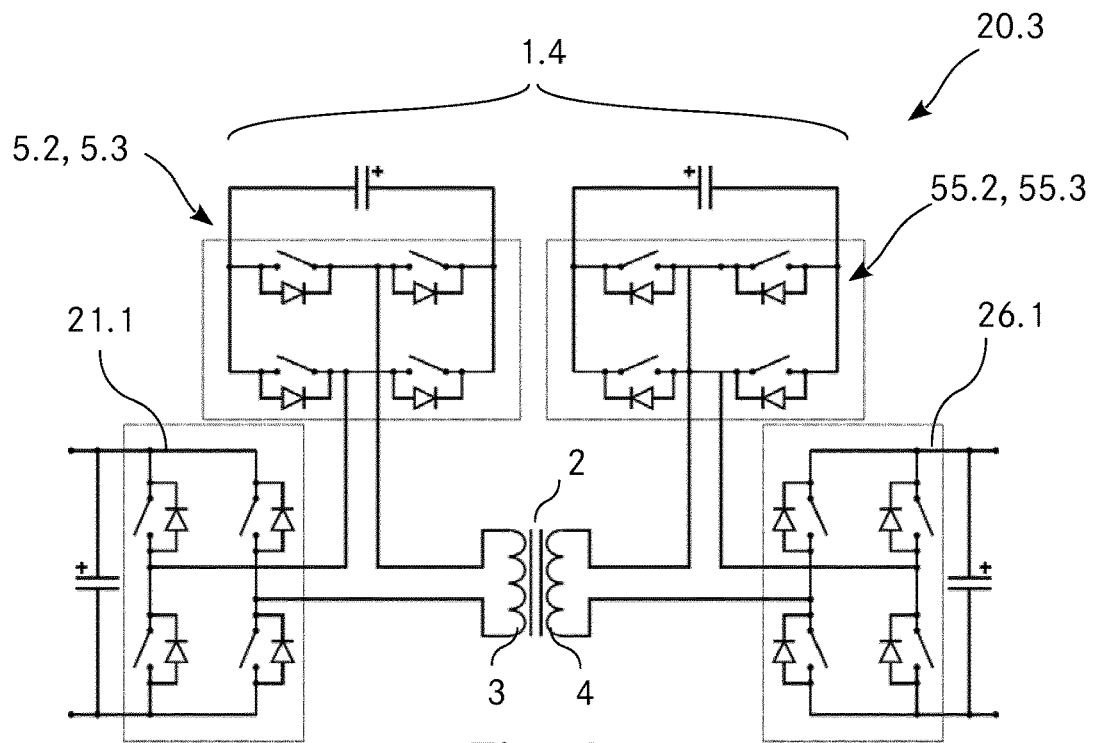
FIG. 8 a third embodiment of the power conversion unit comprising a power transmission unit according to the invention and two AC power units.

FIG. 8 shows a third possible embodiment of the power conversion unit 20.3 again comprising as first AC power unit 21.1 and as second AC power unit 26.1 a power unit 21.1, 26.1 shown in FIG. 5A. In contrast to the embodiment shown in FIG. 7, the present power conversion unit 20.3 comprises a fourth possible embodiment of the power transmission unit 1.4 according to the invention which has an auxiliary AC unit 5.2, 5.3 with full bridge converter and a second auxiliary AC unit 55.2, 55.3 with full bridge converter. The second auxiliary AC unit 55.2, 55.3 is connected in series with second winding 4 of main transformer 2 to form a second series connection which is further connected to the second AC power unit 26.1. Auxiliary AC unit 5.2, 5.3 is connected in series with the first winding 3 of the main transformer 2 and to the first AC unit 21.1.

Figure 9:
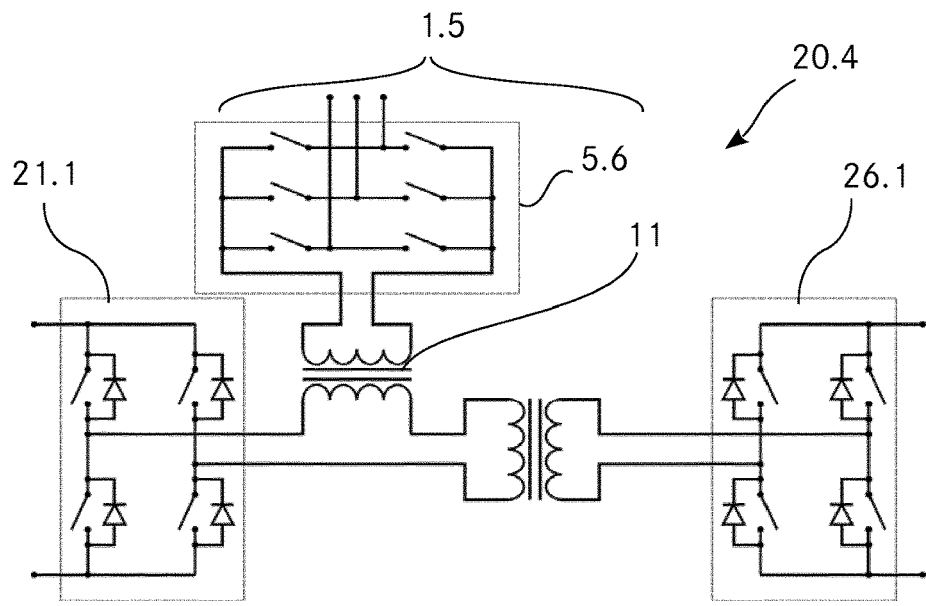
FIG. 9 a fourth embodiment of the power conversion unit comprising a power transmission unit according to the invention and two AC power units, FIG. 10 a fifth embodiment of the power conversion unit comprising a power transmission unit according to the invention and two AC power units.

FIG. 9 shows a fourth possible embodiment of a power conversion unit 20.4 again comprising as first AC power unit 21.1 and as second AC power unit 26.1 the AC power unit 21.1, 26.1 shown in FIG. 5A. In contrast to the power conversion units 20.1, 20.2 and 20.3 shown in FIGS. 4, 7 and 8, respectively, the power conversion unit 20.4 of FIG. 9 comprises another power transmission unit 1.5 according to the invention. This power transmission unit 1.5 has an auxiliary AC unit 5.6 with three phases and works as an AC-AC converter and further comprises an auxiliary transformer 11.

Figure 10:
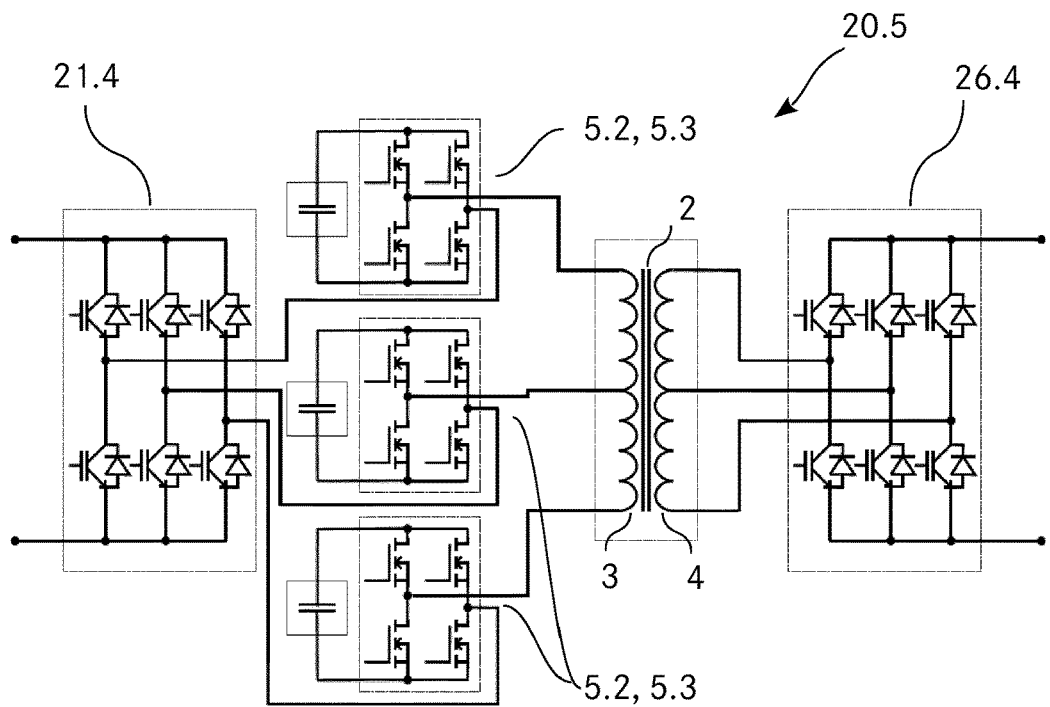

FIG. 10 shows a fifth possible embodiment of a power conversion unit 20.5 which comprises a first AC power unit 21.4 with a three phase converter and the fourth embodiment of the second AC power unit 26.4 with another three phase converter. The main transformer 2 of this power conversion unit 20.5 is as well configured as three phase transformer with a first winding 3 having three phases and a second winding 4 having three phases. The three AC phases of the converter of the first AC power unit 21.4 are each connected in series to a different full bridge converter 5.2, 5.3 which is further connected to a respective phase of the first winding 3 of the main transformer 2. The second AC power unit 26.4 is connected to the second winding 4 of the main transformer 2.

Figure 11:
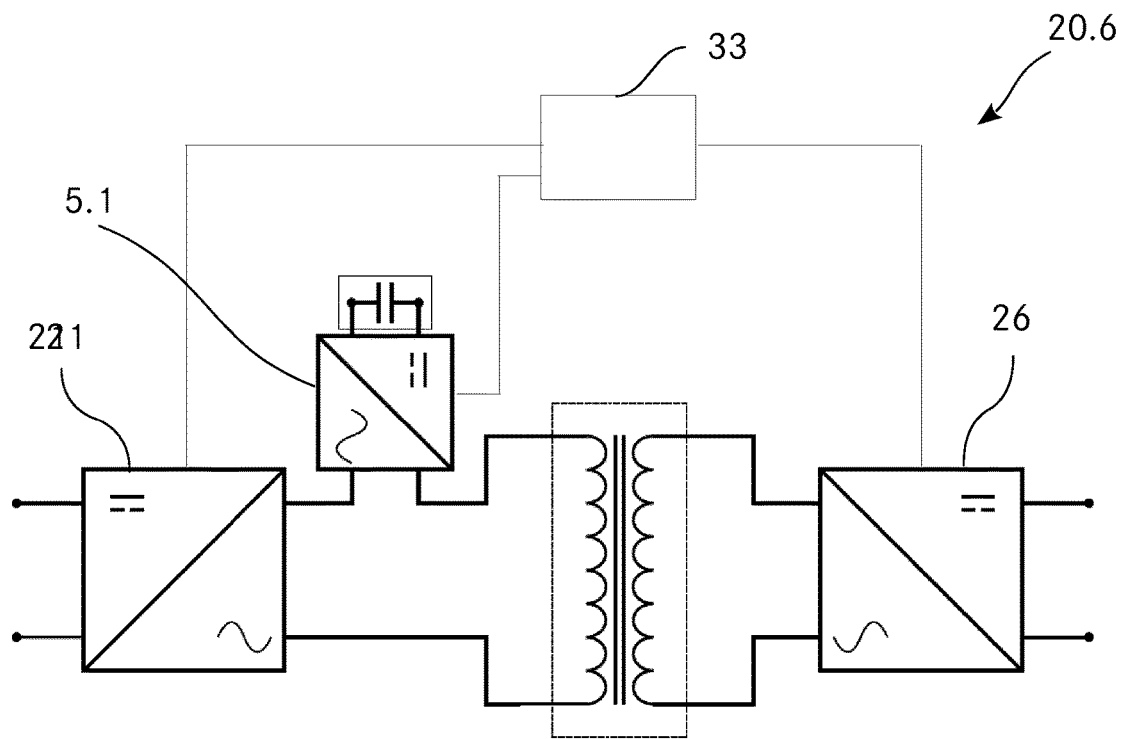
FIG. 11 a sixth embodiment of the power conversion unit comprising a power transmission unit according to the invention and two AC power units.

FIG. 11 shows a sixth possible embodiment of a power conversion unit 20.6. This embodiment is in most parts identical to the power conversion unit 20.1 shown in FIG. 4 but comprises an additional control unit 33. This control unit 33 controls the first AC power unit 21, the second AC power unit 26 and the auxiliary AC unit 5.1. In variants, it is however as well possible that the control unit 33 only controls the auxiliary AC unit 5.1, only the first AC power unit 21, only the second AC power unit 26, only the auxiliary AC unit 5.1 and the first AC power unit 21, only the auxiliary AC unit 5.1 and the second AC power unit 26 or only the first AC power unit 21 and the second AC power unit 26.

Figure 12:
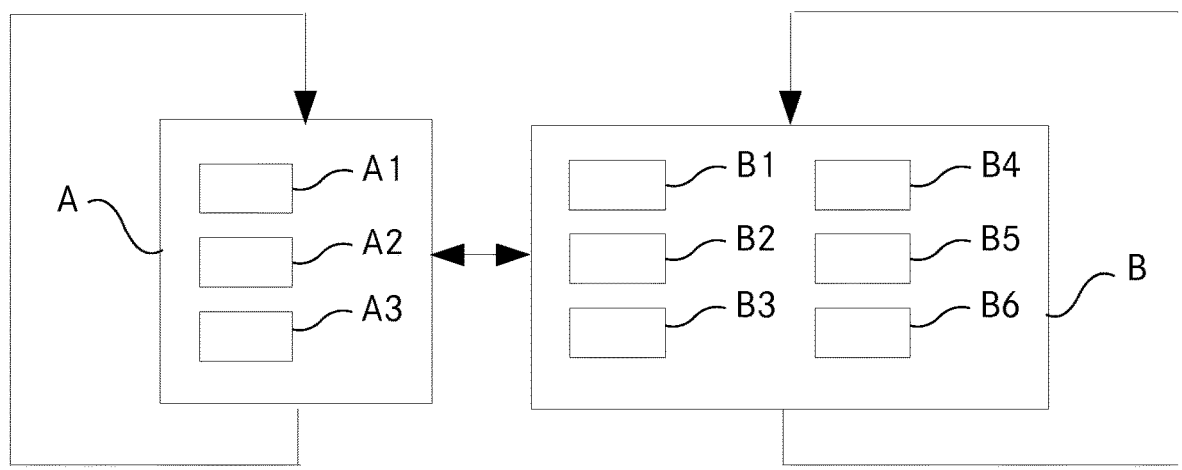
FIG. 12 a flow chart of the method according to the invention.

FIG. 12 shows a flow chart of the method according to the invention. The method comprises steps A and B. In the present example, step A further comprises steps A1, A2 and A3, and step B comprises steps B1, B2, B3, B4, B5 and B6. These steps are explained in more detail above in the context of FIG. 6. Even though the steps are explained there in view of the power conversion unit 20.1 shown in FIG. 4, the method with these steps can be applied to any power conversion unit comprising a power transmission unit according to the invention, a first power unit connected with the series connection of the power transmission unit, and a second power unit connected with the second winding of the main transformer.

In summary, it is to be noted that the invention is not limited to the above mentioned embodiments. For example, a variety of different types of the auxiliary AC unit with different converters 9, with and without auxiliary transformer 11, with or without energy storage 12, as well as different types the first AC power unit 21 and different types of the second AC power unit 26 have been shown. All of these embodiments and variants can be combined resulting in a variety of different advantageous power transmission units and a variety of different advantageous power conversion units.

The power transmission unit according to the invention, as well as the power conversion unit and the method for controlling a flow of electric energy provide interesting advantages over the prior art as for example improved efficiency over a virtually unlimited operating range. Therefore, the invention can be used for a wide range of applications.

The invention claimed is:

1. A power conversion unit for converting electric power, comprising: a) power transmission unit for controlling a flow of electric energy between two AC power units, comprising a main transformer having a first winding and a second winding and a switchable auxiliary AC unit for applying a tunable auxiliary AC voltage across an auxiliary AC side of the auxiliary AC unit, wherein the auxiliary AC side is connected in series with the first winding of the main transformer to form a series connection, b) a first AC power unit connected with the series connection of the power transmission unit, and c) a second AC power unit connected with the second winding of the main transformer, wherein the first AC power unit comprises a converter having a first AC side being connected with the series connection and/or the second AC power unit comprises a converter having a second AC side being connected with the second winding of the main transformer, d) a control unit for controlling the auxiliary AC unit and/or the first AC power unit and/or the second AC power unit, wherein the control unit is adapted for zero-current switching of the first AC power unit and/or the second AC power unit, and/or wherein the control unit is adapted for controlling the auxiliary AC unit such that a current through the first AC power unit is in phase with a first AC voltage of the first AC power unit, and/or such that a current through the second AC power unit is in phase with a second AC voltage of the second AC power unity and wherein the control unit is adapted for controlling the auxiliary AC unit and/or the first AC power unit and/or the second AC power unit by using a step A of providing the auxiliary AC voltage across the auxiliary AC side of the auxiliary AC unit for shaping a first current through the first AC power unit and/or for shaping a second current through the second AC power unit, wherein the auxiliary AC voltage comprises pulses of different polarities during a half wave of the auxiliary AC voltage, and a step B of synchronizing a first AC voltage across the first AC side of the first AC power unit with a second AC voltage across the second AC side of the second AC power unit, and/or synchronizing the first AC voltage across the first AC side of the first AC power unit with the auxiliary AC voltage.

2. The power conversion unit according to claim 1, wherein the auxiliary AC unit further comprises an energy storage.

3. The power conversion unit according to claim 1, wherein the auxiliary AC unit further comprises a converter.

4. The power conversion unit according to claim 1, wherein the auxiliary AC unit further comprises an auxiliary transformer.

5. A method for controlling a flow of electric energy by using the power conversion unit according to claim 1, comprising: a step A of providing the auxiliary AC voltage across the auxiliary AC side of the auxiliary AC unit for shaping the first current through the first AC power unit and/or for shaping the second current through the second AC power unit, wherein the auxiliary AC voltage comprises pulses of different polarities during the half wave of the auxiliary AC voltage, and a step B of synchronizing the first AC voltage across the first AC side of the first AC power unit with the second AC voltage across the second AC side of the second AC power unit, and/or synchronizing the first AC voltage across the first AC side of the first AC power unit with the auxiliary AC voltage.

6. The method according to claim 5, wherein generating the pulses of the auxiliary AC voltage comprises:
a step A1 of switching a converter of the auxiliary AC unit such that the auxiliary AC voltage has a first polarity, and
a step A2 of switching the converter of the auxiliary AC unit such that the auxiliary AC voltage has a second polarity opposite to the first polarity,
and wherein synchronizing the first AC voltage across the first AC side of the first AC power unit with the second AC, voltage across the second AC side of the second AC power unit comprises:
a step B1 of switching the converter of the first AC power unit such that the first AC voltage has a third polarity,
a step B2 of switching the converter of the first AC power unit such that the first AC voltage has a fourth polarity opposite to the third polarity.

7. The method according to claim 6, wherein generating the pulses of the auxiliary AC voltage further comprises
a step A3 of switching the converter of the auxiliary AC unit to provide a conducting path with zero voltage across the auxiliary AC side of the auxiliary AC unit,
and wherein synchronizing the first AC voltage across the first AC side of the first AC power unit with the second AC voltage across the second AC side of the second AC power unit further comprises
a step B3 of switching off all switches of the converter of the first AC power unit.

8. The method according to claim 6, wherein steps B1, and/or B2, and/or B3 are performed when the first current is zero.

9. The method according to claim 5, wherein a mean value of the auxiliary AC voltage measured over the half wave of the auxiliary AC voltage is zero.

10. The method according to claim 5, wherein a mean value of a power flow through the auxiliary AC unit measured over a half wave of the power flow through the auxiliary AC unit is essentially zero.

* * * * *